United States Patent [19]
Watanabe et al.

[11] Patent Number: 5,513,685
[45] Date of Patent: May 7, 1996

[54] PNEUMATIC RADIAL TIRES FOR AIRPLANES INCLUDING ZIGZAG BELT CORDS

[75] Inventors: Jun Watanabe; Norio Inada, both of Kodaira, Japan

[73] Assignee: Bridgestone Corporation, Tokyo, Japan

[21] Appl. No.: 404,989

[22] Filed: Mar. 16, 1995

Related U.S. Application Data

[62] Division of Ser. No. 266,881, Jul. 5, 1994, Pat. No. 5,427,167, which is a continuation of Ser. No. 968,521, Oct. 29, 1992, abandoned.

[30] Foreign Application Priority Data

| Oct. 29, 1991 | [JP] | Japan | 3-309657 |
| Sep. 4, 1992 | [JP] | Japan | 4-263035 |

[51] Int. Cl.$^6$ .................. B60C 9/18; B60C 9/20
[52] U.S. Cl. .................. 152/531; 152/533; 152/535; 156/117; 156/177
[58] Field of Search .................. 152/531, 533–535, 152/553; 156/117, 173, 175, 177, 910

[56] References Cited

U.S. PATENT DOCUMENTS

| 3,024,828 | 3/1962 | Smith et al. . | |
| 3,550,667 | 12/1970 | Bartley . | |
| 3,589,426 | 6/1971 | Varner | 152/533 |
| 3,598,166 | 8/1971 | Wells . | |
| 3,720,569 | 3/1973 | Kimble . | |
| 3,770,042 | 11/1973 | Greene et al. | 152/533 X |
| 4,002,789 | 1/1977 | Klein | 152/533 X |
| 4,258,775 | 3/1981 | Samoto | 152/531 |
| 4,600,456 | 7/1986 | Oswald | 156/117 |
| 4,838,966 | 6/1989 | Oswald . | |
| 4,874,455 | 10/1989 | Ginter . | |

FOREIGN PATENT DOCUMENTS

| 0501782 | 9/1992 | European Pat. Off. | 152/533 |
| 1268334 | 9/1960 | France . | |
| 1598729 | 7/1970 | France . | |
| 48-96259 | 11/1973 | Japan . | |
| 810425 | 3/1959 | United Kingdom . | |
| 2216076 | 10/1989 | United Kingdom . | |
| 2236286 | 4/1991 | United Kingdom . | |
| WO8803481 | 5/1988 | WIPO . | |

*Primary Examiner*—Adrienne C. Johnstone
*Attorney, Agent, or Firm*—Sughrue, Mion, Zinn, Macpeak & Seas

[57] ABSTRACT

A pneumatic radial tire for airplanes comprises a toroidal carcass of at least two carcass plies, a tread rubber superimposed on the carcass, and a belt disposed between the carcass and the tread rubber, in which the belt is comprised of a plurality of radially inner belt plies and a plurality of radially outer belt plies, and each of the radially inner belt plies contains cords extending substantially zigzag at a cord angle A of 5–15° with respect to the equatorial plane in the circumferential direction while radially being bent at both side ends of the ply, and each of the outer belt plies contains cords having a cord angle B larger than the cord angle A. In this tire, the occurrences of standing wave and cut peel off are prevented with the reduction of tire weight.

3 Claims, 11 Drawing Sheets

FIG_1
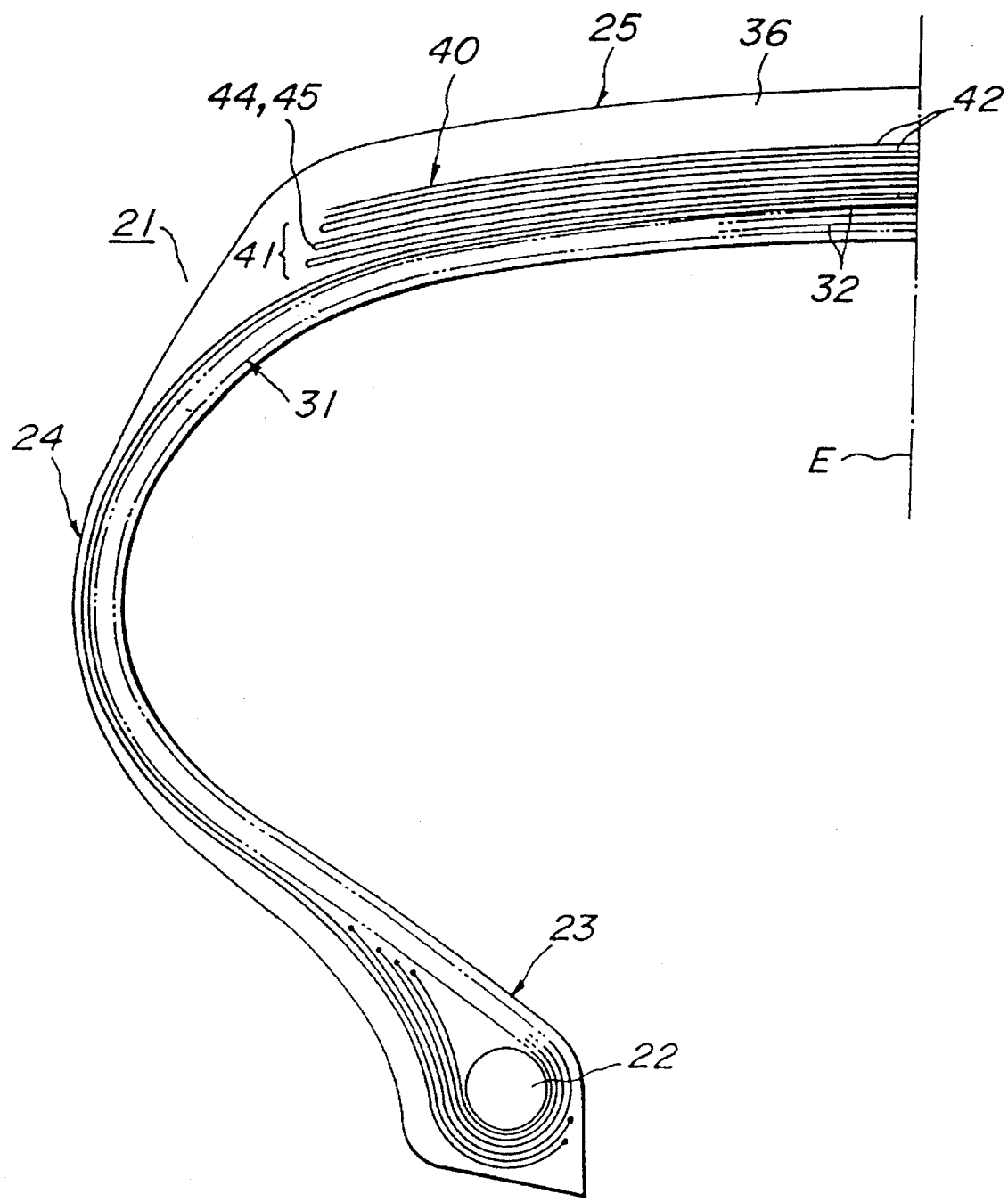

FIG._2
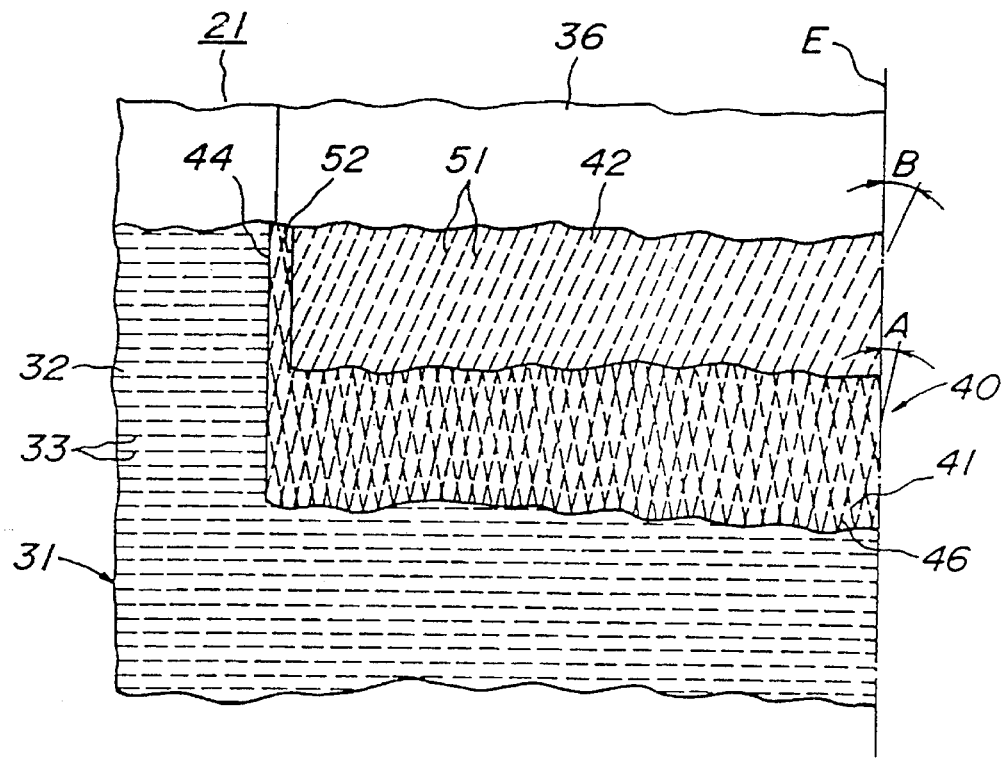
FIG._3
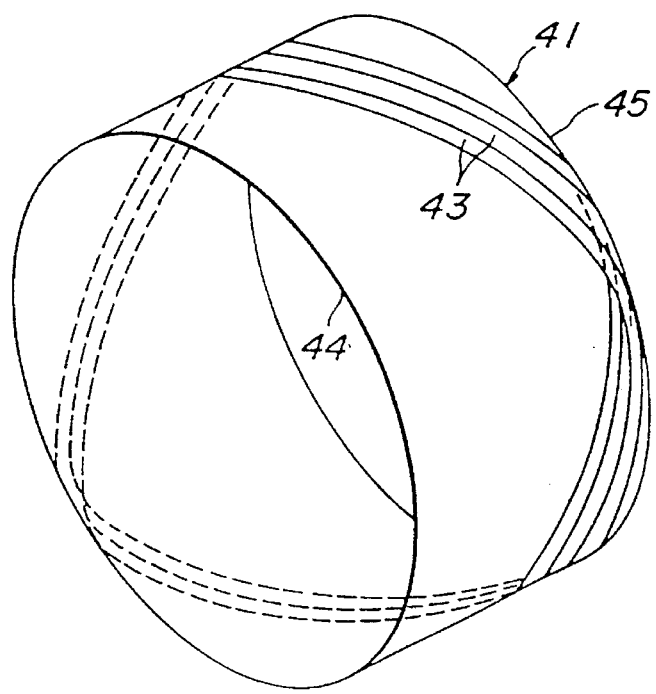

FIG_5

FIG_8

FIG_9

FIG_10

FIG_11

PNEUMATIC RADIAL TIRES FOR AIRPLANES INCLUDING ZIGZAG BELT CORDS

This is a division of application Ser. No. 08/266,881 filed Jul. 5, 1994, now U.S. Pat. No. 5,427,167, which is a continuation of application Ser. No. 07/968,521, now abandoned filed Oct. 29, 1992.

BACKGROUND OF THE INVENTION

1. Field of the Invention

This invention relates to a pneumatic radial tire for airplanes comprising a belt comprised of plural belt plies each containing cords embedded therein in which these cords extending substantially zigzag in the circumferential direction of the belt ply while being axially bent at both side ends of the belt ply.

2. Description of the Related Art

As this type of the radial tire, there has hitherto been known a tire described, for example, in Japanese Utility Model laid open No. 48-96259. Such a tire comprises a belt comprised of plural belt plies each containing cords substantially uniformly embedded in the ply over a full width thereof to zigzag extend substantially in the circumferential direction while being axially bent at both side ends of the ply.

Since cut ends of the cords are not exposed at both side ends of the ply in such a radial tire, even when a cord angle of the ply with respect to an equatorial plane of the tire is made small for enhancing the total strength of the belt, the shearing strain between the plies at the belt end is small and the belt end separation hardly occurs. Consequently the total number of the belt plies can be reduced while maintaining a given safety level. Such a weight reduction of the belt can control the occurrence of a standing wave during running at a high speed on a runway through take off, so that the tire having the aforementioned belt plies can be said to be very suitable as a tire for airplanes.

However, when the belt is constructed only by piling a plurality of such belt plies one upon the other, if it is intended to run the tire at high speed after the tire is subjected to damage arriving at the inside of the belt, there is caused a problem that cracks are caused between belt plies in the vicinity of a deepest portion of such damage and grow finally a so-called cut peel off of scattering the belt and tread rubber around during running is caused. Therefore, such a belt ply is not used in the actual radial tires for airplanes though it has many merits.

SUMMARY OF THE INVENTION

It is, therefore, an object of the invention to provide a pneumatic radial tire for airplanes capable of preventing the occurrence of cut peel off while preventing the occurrence of a standing wave with the weight reduction.

According to the invention, there is the provision of a pneumatic radial tire for airplanes comprising a toroidal carcass comprised of at least two carcass plies each containing many cords arranged substantially in a direction perpendicular to an equatorial plane of the tire, a tread rubber arranged outward on the carcass in a radial direction of the tire, and a belt disposed between the carcass and the tread rubber, said belt being comprised of a plurality of radially inner belt plies located at a side near to the carcass and a plurality of radially outer belt plies located at a side near to the tread rubber, each of said inner belt plies containing cords embedded substantially uniformly in the ply over a full width thereof, in which each of said cords extends substantially zigzag at a cord angle A of 5°–15° with respect to the equatorial plane in the circumferential direction while being axially bent at both side ends of the ply, and each of said outer belt plies containing cords embedded substantially uniformly in the ply over a full width thereof, in which a cord angle B with respect to the equatorial plane is larger than said cord angle A.

In this invention, the cords having a cord angle A of 5°–15° with respect to the equatorial plane are embedded zigzag in each of the plural radially inner belt plies located at a side near to the carcass among the belt plies constituting the belt, so that the total number of the belt plies can be reduced to reduce the weight of the belt while maintaining total strength of the belt and also the occurrence of a standing wave during the running at a high speed can be prevented. Furthermore, the cords having a cord angle B which are larger than the cord angle A with respect to the equatorial plane are embedded in each of the plural outer belt plies located at a side near to the tread rubber so that the shearing strain in the circumferential direction between the belt plies during the running at the high speed is reduced. Even if the damage is caused in the inner most belt ply of the belt, the occurrence of cracks from the damage is suppressed and hence the occurrence of the cut peel off is prevented.

In a preferred embodiment of the invention, the cords in each radially outer belt ply are arranged at a given inclination angle with respect to the equatorial plane so as to locate their cut ends at both side ends of the ply, or extend zigzag substantially in the circumferential direction while being axially bent at both side ends of the ply.

In another preferred embodiment of the invention, the cord angle B in each radially outer belt ply is made larger than the cord angle A of each radially inner belt ply by not less than 5°, whereby the shearing strain in the circumferential direction between the plies can be sufficiently reduced.

In the other preferred embodiment of the invention, each radially inner belt ply is formed by winding a rubberized strip of plural nylon cords many times while being shifted in the circumferential direction and reciprocatedly moved between the side ends of the ply, provided that a ratio of the radius of curvature R in the strip at the side end of the ply to a width of the strip W is not less than 2.0. In this case, the residual strain produced in the strip can be sufficiently decreased by axially bending the strip at the side end of each ply, and hence the fatigue of zigzag-bent nylon cord can surely prevented.

In a still further preferred embodiment of the invention, each of both side end portions between adjoining two inner belt plies is provided with a further extra laminated portion of the strip continuously extending in the circumferential direction. When the number of the inner belt plies is 4 or more, these extra laminated portions are piled one upon the other in the radial direction. In this case, the circumferential rigidity in the vicinity of the side end of each ply or the tread end can locally be increased, so that the radial growth in the vicinity of the tread end portion during the running at the high speed can be effectively prevented.

BRIEF DESCRIPTION OF THE DRAWINGS

The invention will be described with reference to the accompanying drawings, wherein:

FIG. 1 is a schematically section view of a first embodiment of the tire according to the invention;

FIG. 2 is a partially cutaway top view of the tire shown in FIG. 1;

FIG. 3 is a schematically perspective view of an inner belt ply in the middle of the formation;

DESCRIPTION OF THE PREFERRED EMBODIMENTS

Figure 4:
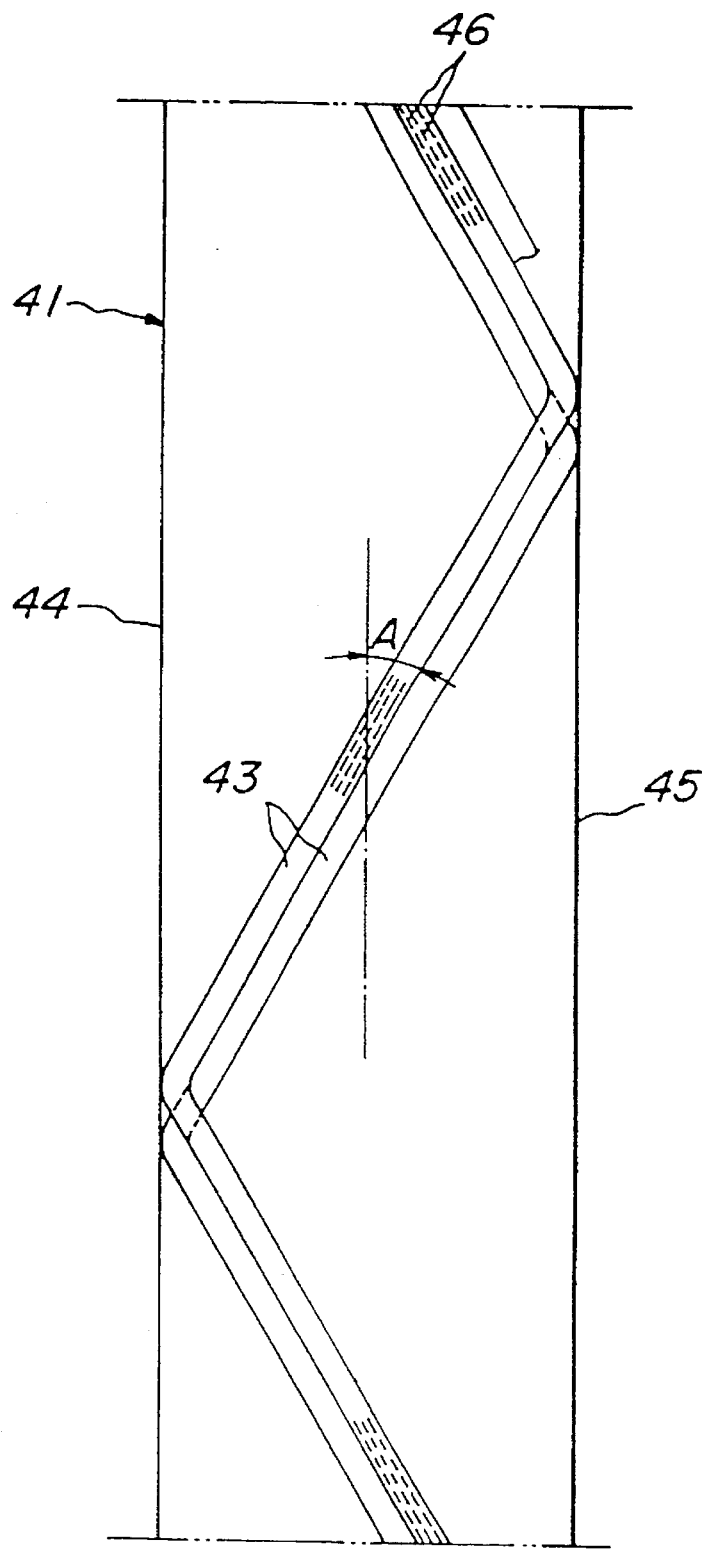
FIG. 4 is a schematically developed view of the inner belt ply in the middle of the formation.

In FIGS. 1 and 2, numeral 21 is a radial tire to be mounted onto an airplane, which comprises a pair of bead portions 23 each containing a bead ring 22 embedded therein, a sidewall portion 24 extending substantially outward from each of the bead portions 23 in the radial direction of the tire, and a tread portion 25 of substantially cylindrical shape extending between radially outer ends of these sidewall portions 24. Furthermore, the tire 21 is reinforced with a carcass 31 toroidally extending from one of the bead portions 23 to the other bead portion 23. The carcass 31 is comprised of at least two carcass plies 32, e.g. six carcass plies 32 in the illustrated embodiment. Among these carcass plies 32, four inner plies are wound around the bead core 22 from inside of the tire toward outside thereof to form turnup portions, while two outer plies are extended downward to the bead ring 22 along the outside of the turnup portion of the inner carcass ply 32. Each of these carcass plies 32 contains many nylon cords 33 such as nylon-6,6 cords extending substantially perpendicular to an equatorial plane E of the tire (i.e. extending in the radial direction of the tire). A tread rubber 36 is arranged on the outside of the carcass 31 in the radial direction.

A belt 40 is arranged between the carcass 31 and the tread rubber 36 and is comprised of plural inner belt plies 41 located near the carcass 31, i.e. six inner belt plies in the illustrated embodiment and plural outer belt plies 42 located near the tread rubber 36, i.e. two outer belt plies in the illustrated embodiment. As shown in FIGS. 3 and 4, each of the inner belt plies 41 is formed by providing a rubberized strip 43 of one or more cords, winding the strip 43 in the circumferential direction while being reciprocated only one between side ends 44 and 45 of the ply every substantially one circumference, and conducting such a winding many times while the strip 43 is shifted at approximately a width of the strip in the circumferential direction so as not to form a gap between the adjoining strips 43. As a result, the cords 46 extend substantially zigzag in the circumferential direction while changing the bending direction at both side ends 44, 45 and are substantially uniformly embedded in the inner belt ply 41 over a full region of the inner belt ply 41. Moreover, if it is intended to form the inner belt ply by the above method, the cords 46 lie one upon another, so that two inner belt plies 41 are formed at once while crossing the cords 46 of these plies with each other.

In the pneumatic radial tire for airplanes, there are various sizes such as 18×4.4, H46×18.0R20, H31×13.0R12 and the like. In any said tire size, the cords 46 of the inner belt plies 41 cross with each other at a cord angle A of 5°–15° with respect to the equatorial plane E of the tire when the strip 43 is reciprocated only once between both side ends 44 and 45 of the ply every circumference as mentioned above.

For the cord 46, use may be made of synthetic resin fiber cords such as nylon cord, Kevlar cord (trade name of polyamide fiber cord) and the like as well as steel cord. Moreover, if it is intended to use the polyamide fiber cord as the cord 46, the polyamide fiber cords are first subjected to a treatment with an RFL adhesive solution satisfying such conditions that a molar ratio of resorcin (R)/formaldehyde (F) is $1/2.3 \leq R/F \leq 1/1.1$, preferably $1/2.0 \leq R/F \leq 1/1.3$, more particularly $1/1.8 \leq R/F \leq 1/1.5$, and a weight ratio as a solid content of resorcin and formaldehyde (RF)/rubber latex (L) is $1/10 \leq RF/L \leq 1/5$, preferably $1/9 \leq RF/L \leq 1/6$, and a weight percentage as a solid content of NaOH added to total solid content (S) is $0.05 \leq S \leq 0.8$, preferably $0.1 \leq S \leq 0.5$, and a weight percentage as $NH_4OH$ of aqueous $NH_3$ solution added to total solid content (A) is $0 \leq A \leq 0.5$, preferably $0 \leq A \leq 0.3$, and a weight percentage of S+A is $0.1 \leq S+A \leq 0.8$, preferably $0.2 \leq S+A \leq 0.5$, and a concentration (%) of total solid content in the adhesive solution (C) is $14 \leq C \leq 24$, preferably $16 \leq C \leq 22$, and weight percentages as solid contents (a, b, c) of vinylpyridine latex (VP), styrene-butadiene rubber latex (SBR) and natural rubber and isoprene rubber latexes (NR+IR) constituting the latex in the adhesive solution are $10 \leq a \leq 80$, preferably $30 \leq a \leq 60$, $0 \leq b \leq 40$, preferably $10 \leq b \leq 30$, and $20 \leq c \leq 60$, preferably $25 \leq c \leq 50$, respectively, and then embedded in rubber and cured. The resulting polyamide fiber cord has a strength of not less than 8.0 g/d, preferably not less than 8.5 g/d, more particularly not less than 9.5 g/d provided that a fineness of the fiber is 3–8 deniers.

Figure 5:
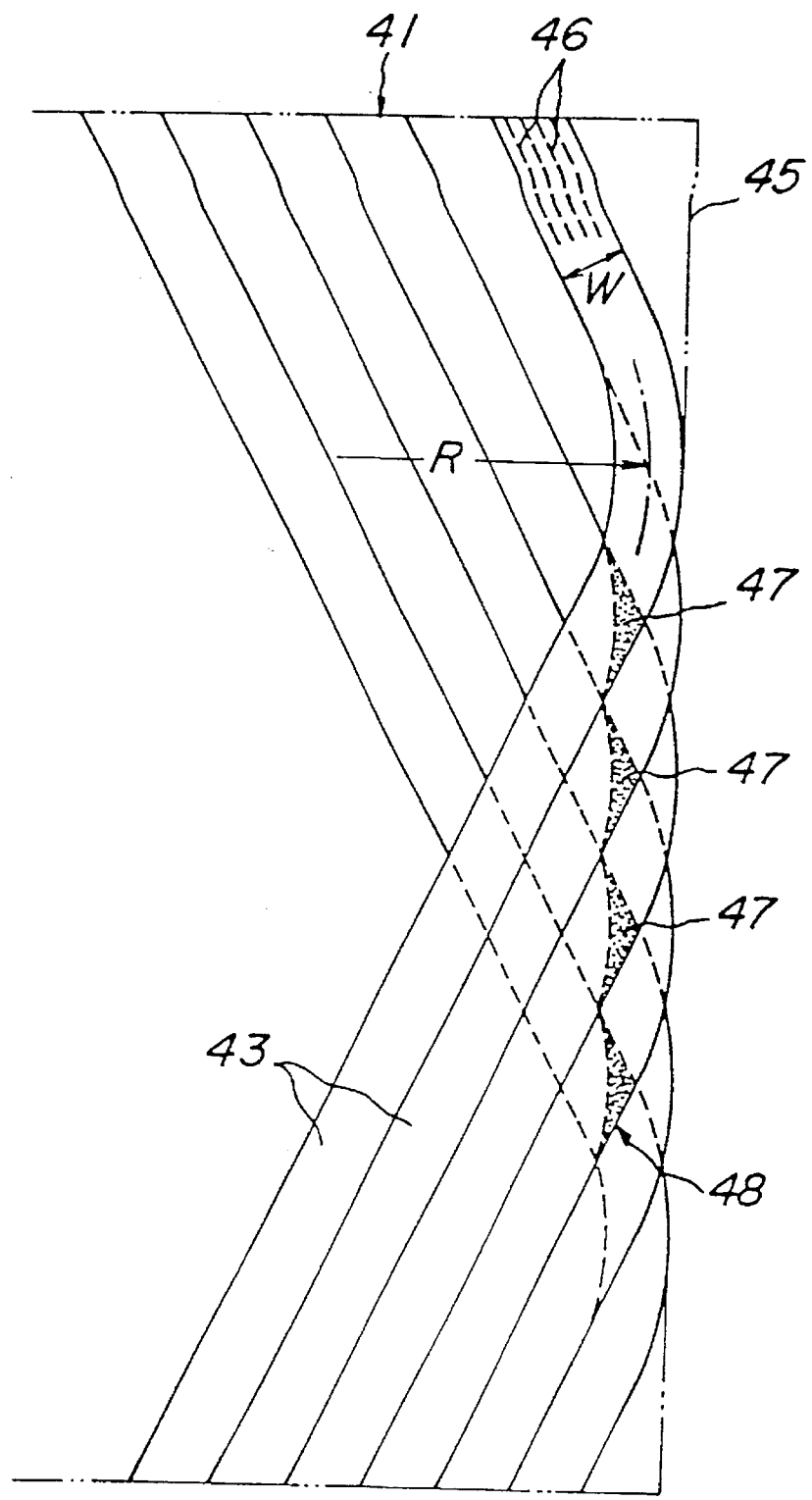
FIG. 5 is an enlargedly developed view of the inner belt ply in the vicinity of the side end of the ply in the middle of the formation.
Figure 6:
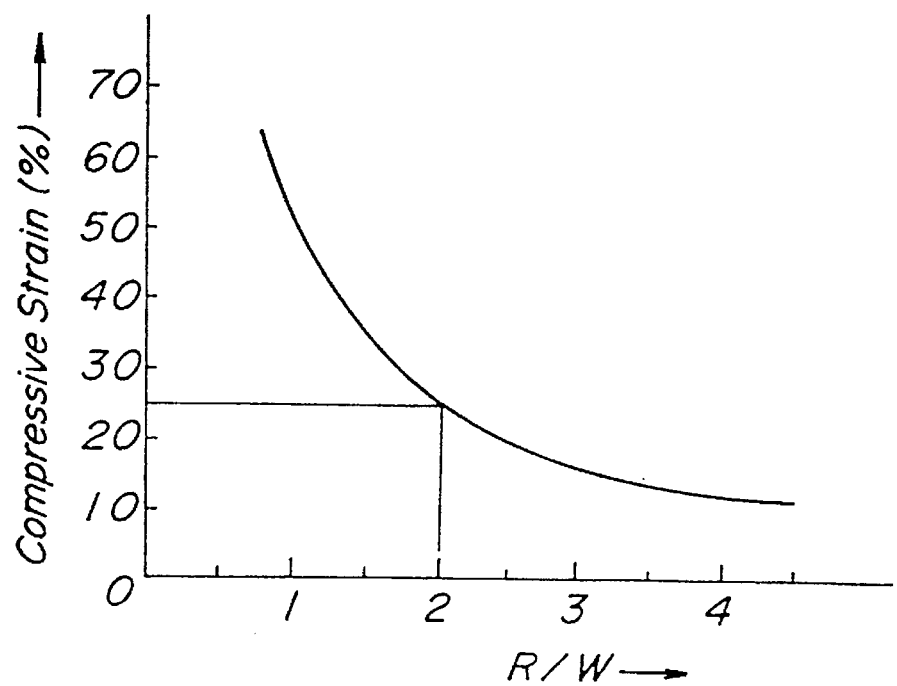
FIG. 6 is a graph showing a relation between compressive strain acting to the cord and R/W.
Figure 7:
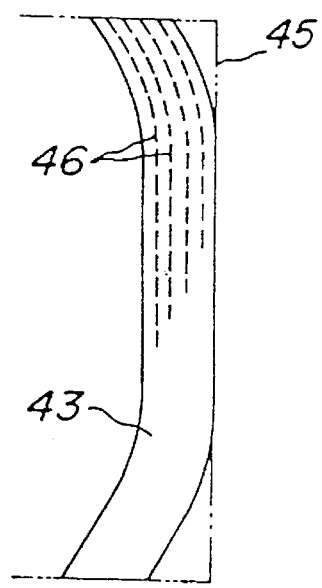
FIG. 7 is an enlargedly developed view of another embodiment of the inner belt ply in the vicinity of the side end of the ply in the middle of the formation.
Figure 8:
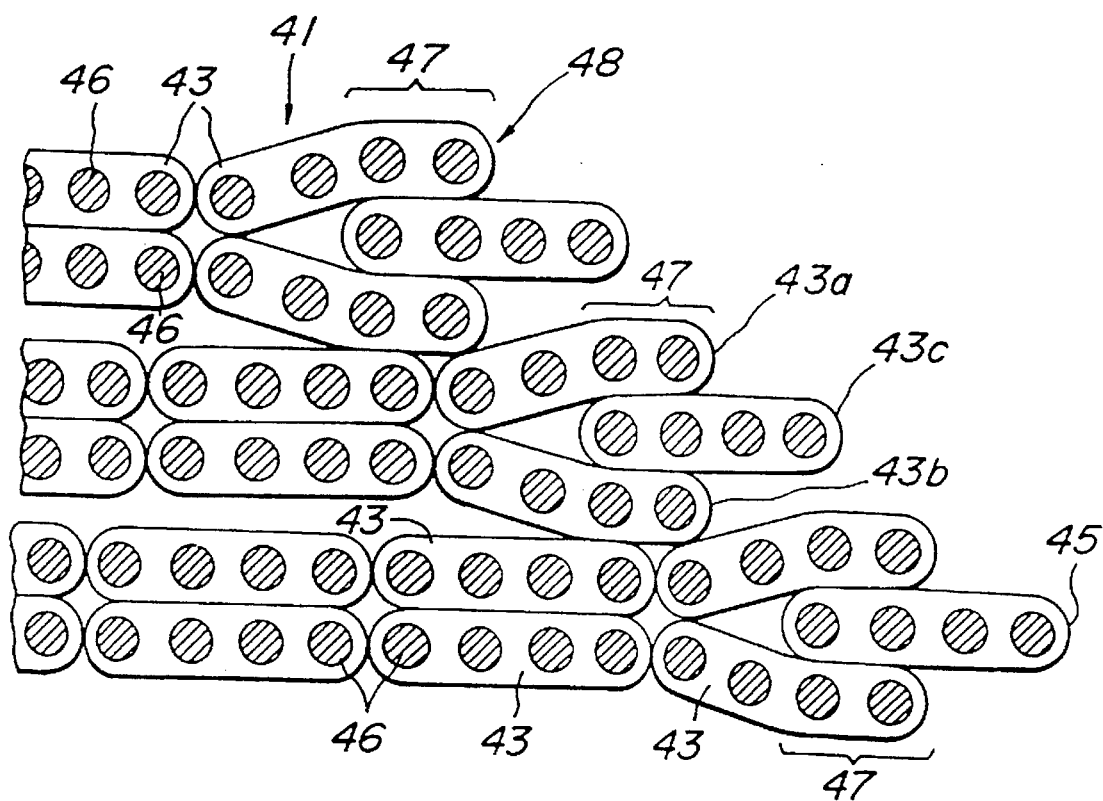
FIG. 8 is a schematically enlarged section view of plural inner belt plies in the vicinity of side end portions of these plies.

In the illustrated embodiment, the widths of the inner belt plies 41 become narrower as the ply is located outward in the radial direction or approaches toward the tread rubber 36. Further, when the inner belt ply 41 is formed by winding the rubberized strip 43 containing plural cords 46 arranged in parallel with each other as mentioned above, a period for forming the ply can be shortened and also the cord arrangement can be made accurate. However, the strip 43 is bent at the side ends 44, 45 of the ply with a small radius of curvature R as shown in FIG. 5, so that a large compressive strain is produced in a cord 46 located at innermost side of the curvature in the strip to remain as a residual strain. When the cord 46 is nylon cord, if the compressive strain exceeds 25%, there is a fear of promoting the cord fatigue. However, when a ratio of R/W (R is a radius of curvature (mm) of the strip 43 at the side ends 44, 45 of the ply, and W is a width of the strip 43) is not less than 2.0 as shown in FIG. 6, the compressive strain produced in the cord 46 can be controlled to not exceed 25%. Moreover, the results shown in FIG. 6 are based on paper calculation. Therefore, when the inner belt ply 41 is formed by using the rubberized strip 43 containing plural nylon cords 46 therein, it is preferable that the value of R/W is not less than 2.0. In addition to the case where the strip 43 is bent at both side ends 44, 45 of the ply in form of an arc as shown in FIG. 5, the strip 43 may have a straight portion extending along the side end 44 (45) and an arc portion located at each end of the straight portion as shown in FIG. 7. Even in the latter case, it is favorable that the value of R/W in the arc portion is not less than 2.0. Furthermore, when the strip 43 is wound while being bent with a given radius of curvature R at both side ends 44, 45 of the ply, a zone 47 of bent a triangle formed by overlapping three strips 43 with each other at a half width of the strip as shown in FIG. 8 is repeatedly created in these bent portions or in the vicinity of both side ends 44, 45 of the ply in the circumferential direction as shown in FIG. 5. There, two strips 43 are usually overlapped with each other by each forming operation, but an extra strip is further overlapped in the bent portion, while these zones 47 forms a narrow-width extra laminated portion 48. The width changes in accordance with the position in the circumferential direction continuously in the circumferential direction. Moreover, these laminated portions 48 locate inward in the axial direction as they locate outward in the radial direction as shown in FIG. 8 because the widths of the inner belt plies 41 become narrower toward the outside in the radial direction as previously mentioned. In the bent portion, the outer end in widthwise direction of the middle strip 43c sandwiched between upper and lower strips 43a and 43b overlaps with the zone 47 located inward from the middle strip 43c in the radial direction as shown in FIG. 8. When the belt 40 is constructed with these inner belt plies 41, the total number of belt plies can be decreased while maintaining total strength reducing the weight and also the occurrence of standing wave during the running at high speed can be prevented.

Figure 9:
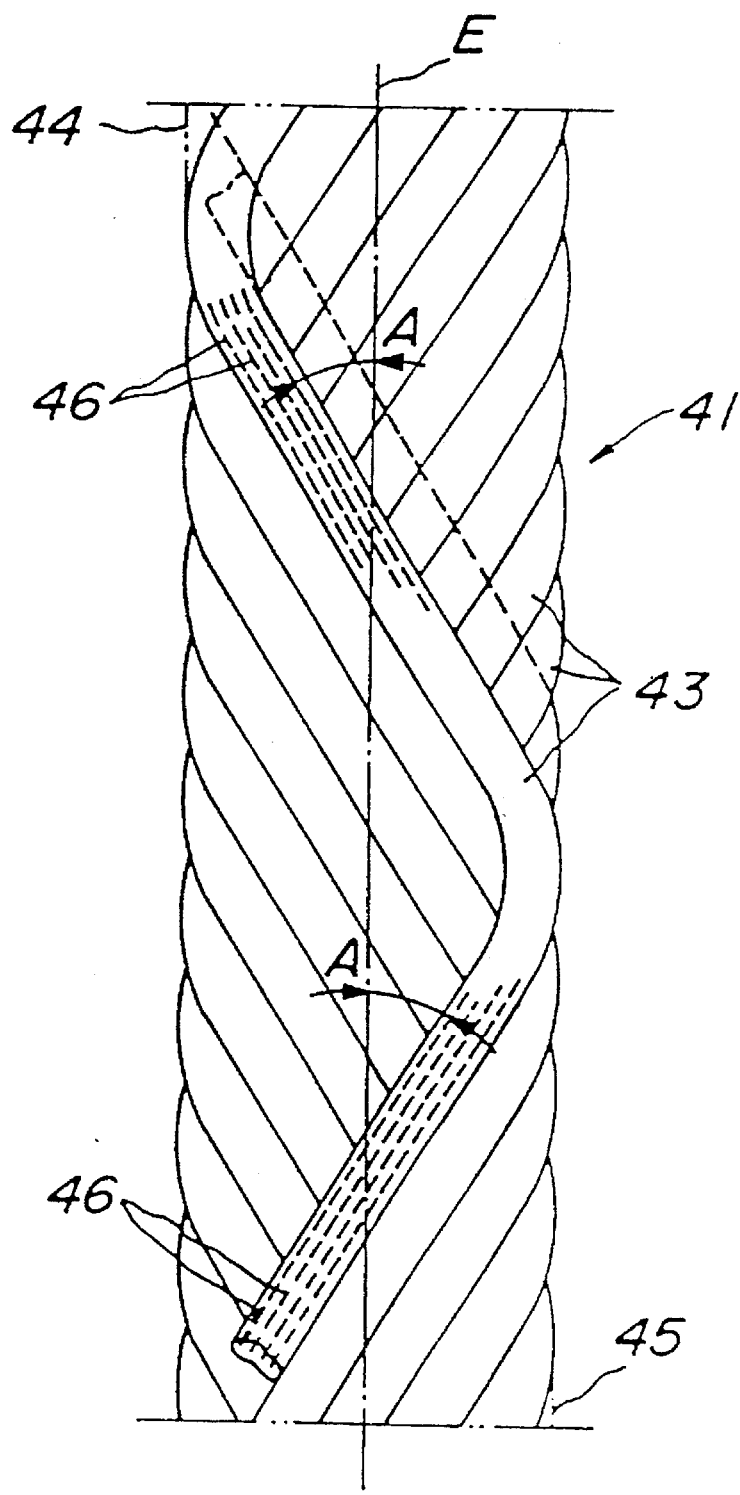
FIG. 9 is a schematically developed view of the inner belt ply located at an outermost side.
Figure 10:
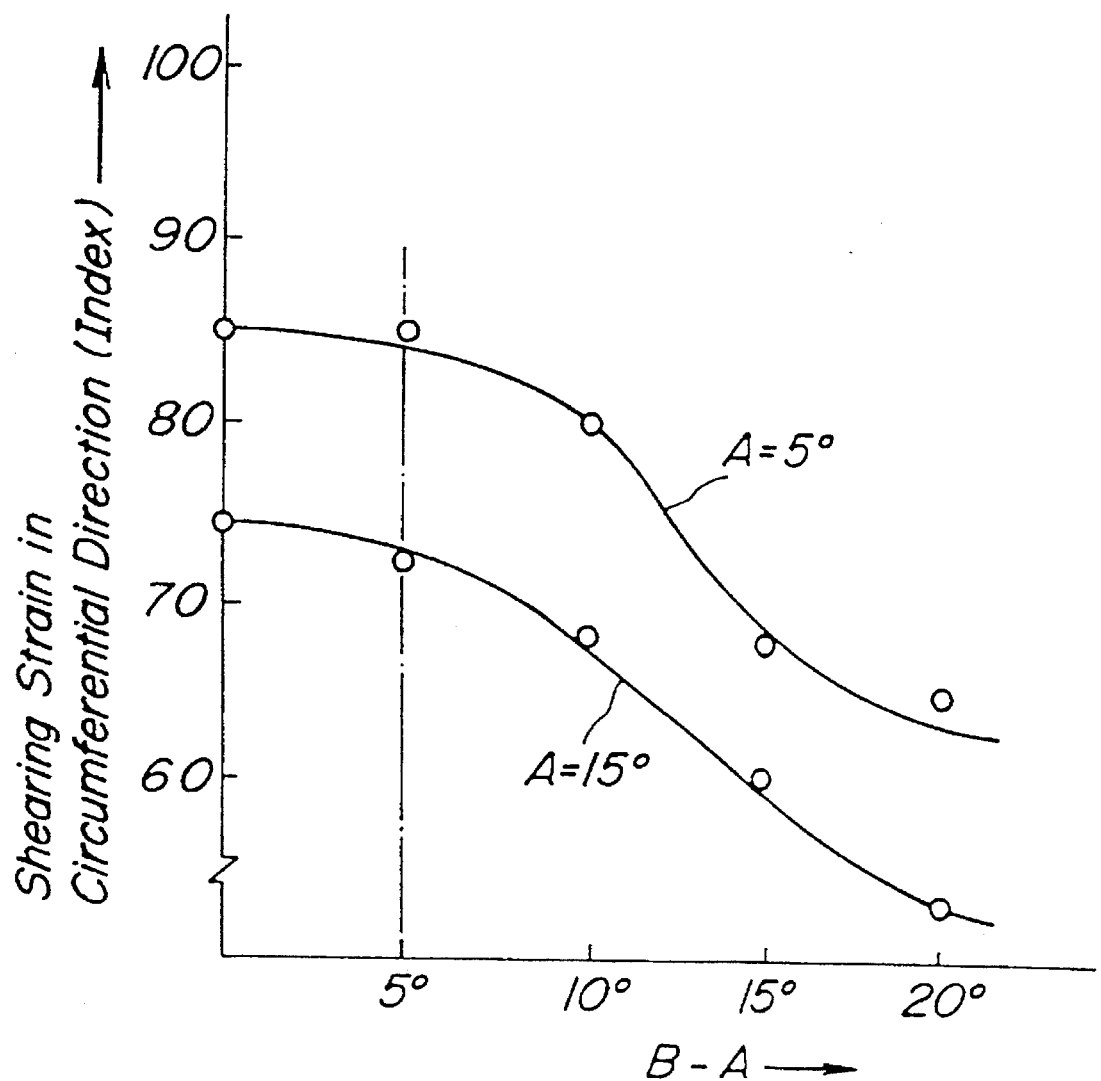
FIG. 10 is a graph showing the relation between shearing strain in circumferential direction and cord angle difference (B−A) in a belt subjected to damage.

Referring to FIGS. 1 and 2, cords 51 having a cord angle B larger than the said cord angle A with respect to the equatorial plane E are substantially uniformly embedded in each of the outer belt plies 42 over a full width of the ply. In this case, the cords 51 in the outer belt ply 42 may be inclined at the cord angle B in the same direction with respect to the equatorial plane E and exposed at their cut ends at both side ends 52 of the ply as shown in FIG. 2. Alternatively they may be extended substantially zigzag in the circumferential direction while being bent at both side ends 52 likewise the cords 46 in the inner belt ply 41. In the former case, at least two belt plies among the outer belt plies 42 (two outer belt plies 42 in the illustrated embodiment) are arranged so that the cords 51 of these plies cross with each other or are inclined in opposite directions. Moreover, the cords 46 of the inner belt ply 41 located at an outermost side among the above inner belt plies 41 are oppositely inclined at a cord angle A with respect to the equatorial plane E in the longitudinal direction of the ply as shown in FIG. 9. Thus there are created two zones in the intersect angle between the cord 51 of the outer belt ply 42 located at an innermost side and the cord 46 of the inner belt ply located at an outermost side, i.e. a zone in which the intersect angle is larger than the cord angle A and a zone in which the intersect angle is smaller than the cord angle A. However, the areas occupied by the cords 46 inclined in the above two directions are approximately equal, so that the areas of the zones having different intersect angles between the cords 51 and 46 become approximately equal and consequently the outer belt ply 42 located at the innermost side can be arranged on the outside of the inner belt ply 41 without considering the inclination direction of the cord 51. In this case, it is favorable that the inclination angle B of the cord 51 in the outer belt ply 42 is larger by not less than 5° than the cord angle A. Because, when the difference between the inclination angle B and the cord angle A is less than 5°, the shearing strain in the circumferential direction is not significantly reduced as shown in FIG. 10 and the cut peel off cannot be sufficiently controlled. FIG. 10 is a graph showing the shearing strain in the circumferential direction measured by the finite element method at a deepest position of damage when a test tire 1 as mentioned later is inflated under an internal pressure and damage is formed at a position inside the belt 40 corresponding to only 0.4 times of the belt thickness on the equatorial plane E of the tire. An ordinate is the shearing strain in circumferential direction as an index value and an abscissa is the difference between the inclination angle B and the cord angle A. Moreover, the value of the shearing strain in circumferential direction in FIG. 10 is represented by an index on the basis that the value (4.2%) of the shearing strain in the circumferential direction at a deepest position of damage in a bias tire having the same tire size when the damage arrives at a position inside the belt corresponding to only 0.4 times of total thickness of belt and carcass is 100. On the other hand, when the inclination angle B is larger than the cord angle A by 20°, the circumferential rigidity of the outer belt ply 42 unfavorably lowers to decrease the safeness of the belt 40 against the internal pressure. Therefore, the difference between the inclination angle B and the cord angle A is preferably not less than 5° but less than 20°.

Figure 11:
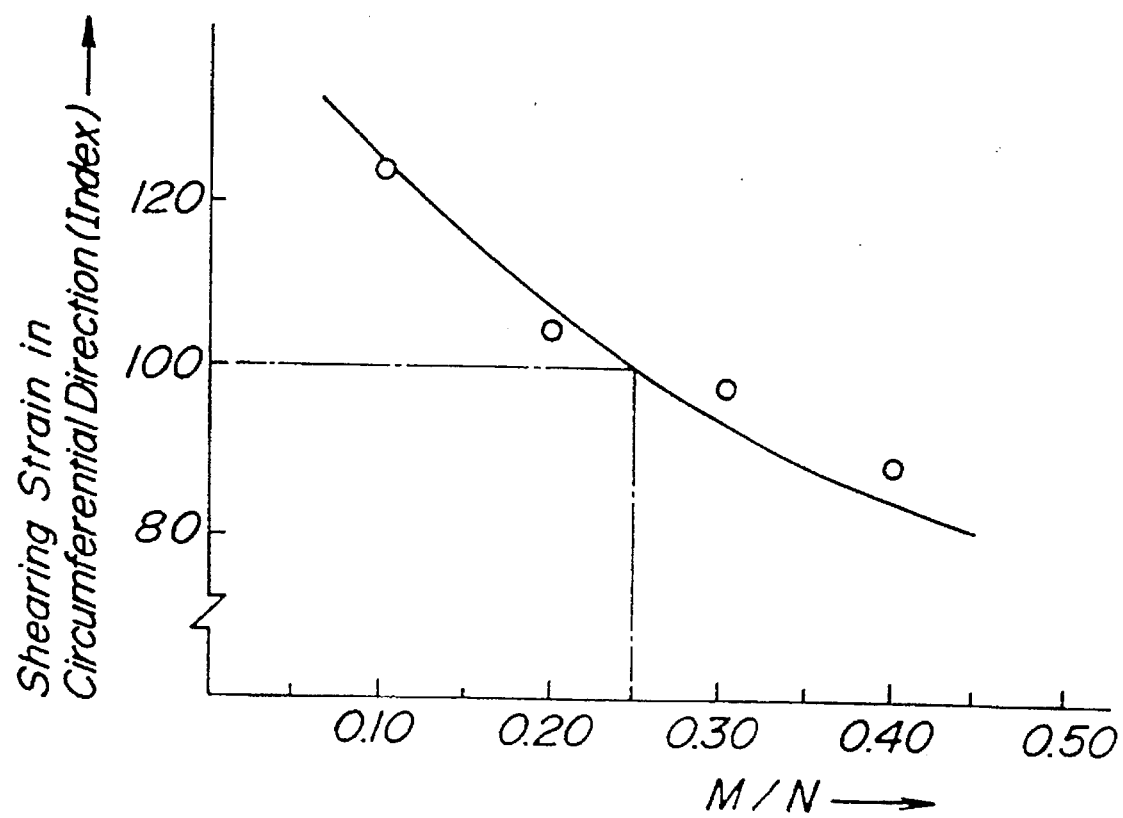
FIG. 11 is a graph showing a relation between shearing strain in circumferential direction and M/N in the belt subjected to damage.

Furthermore, the number M of the outer belt plies 42 is preferable to be not less than 0.25 times total number N of the belt plies constituting the belt or total number of the inner belt plies 41 and the outer belt plies 42. When the value of M/N is less than 0.25, the shearing strain in circumferential direction is larger than that of the bias tire having the same tire size as shown in FIG. 11. There is a fear of causing cut peel off. FIG. 11 is a graph showing the shearing strain in circumferential direction measured by the finite element method in the same tire and position as in FIG. 10, in which an ordinate is an index value of the shearing strain in circumferential direction and an abscissa is a value of M/N. Moreover, the index value of FIG. 11 is the same as in FIG. 10. When the value of M/N exceeds 0.40, the number of the belt plies having a low circumferential rigidity unfavorably increases to decrease the safeness against the internal pressure. When the belt 40 is provided with the above outer belt plies 42, the shearing strain in circumferential direction between the belt plies during the running at high speed reduces and even when the damage is produced to arrive at the inside of the belt 40, the occurrence of cracks from the deepest position of the damage is suppressed and hence the occurrence of the cut peel off is controlled.

Figure 12:
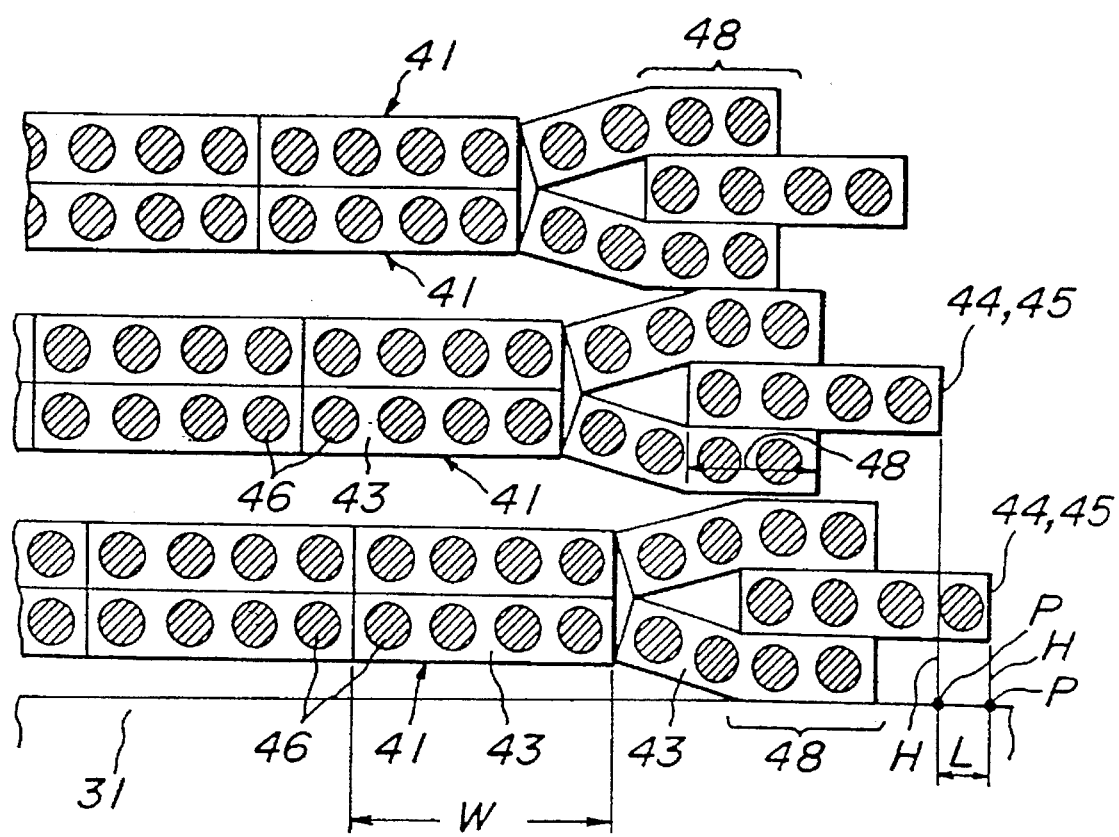
FIG. 12 is a schematically enlarged section view of another embodiment of plural inner belt plies in the vicinity of side end portions of these plies.
Figure 13:
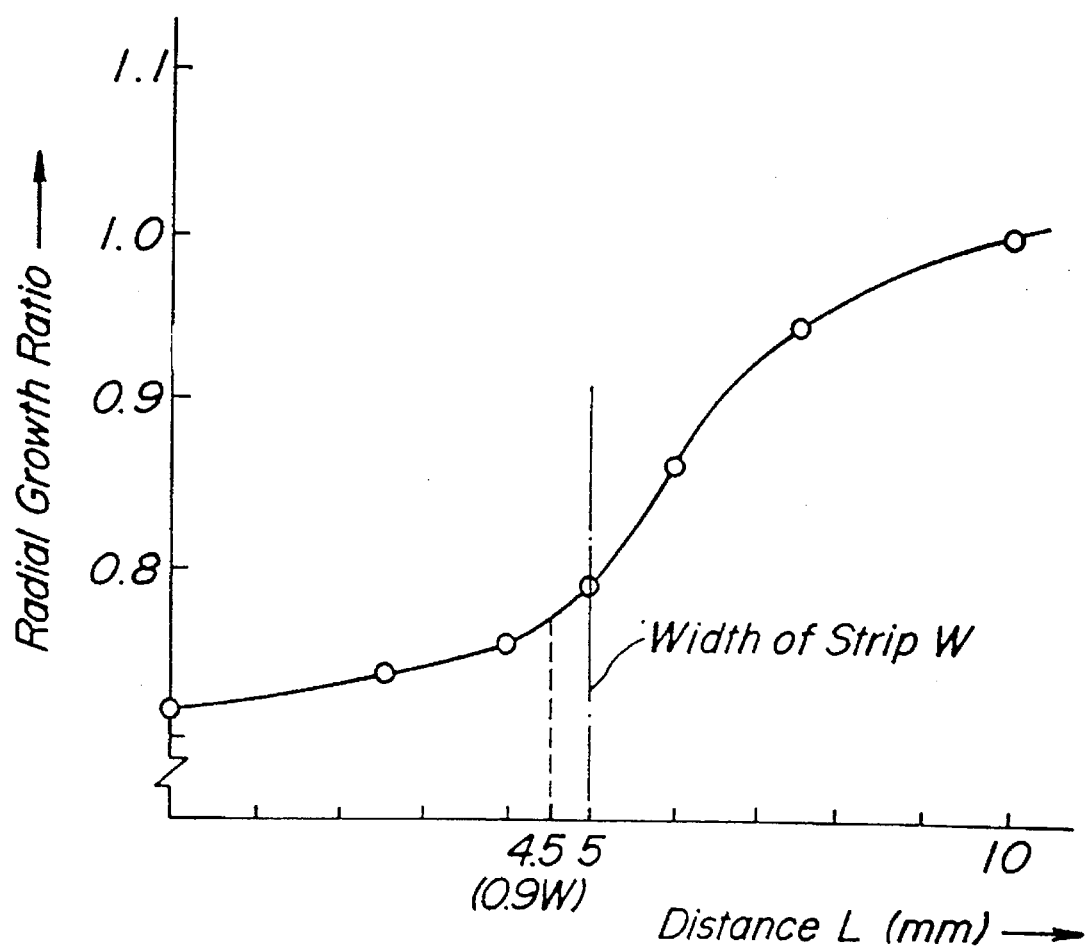
FIG. 13 is a graph showing a relation between distance L and radial growth ratio.

FIG. 12 shows another embodiment of the tire according to the invention and is the same schematical section view as in FIG. 8. In this embodiment, a distance L between the side end 44, 45 of the two inner belt plies 41 formed at once and the side end 44, 45 of another two inner belt plies 41 adjacent thereto, i.e. a distance L measured along the outer surface of the carcass 31 between points P intersecting the outer surface of the carcass 31 with vertical lines H drawn from the side end 44, 45 of each belt ply is not more than 0.9 times the width W of the strip 43. In this manner, when the number of the aforementioned inner belt plies is 4 or more, the adjoining extra laminated portions 48 can be overlapped with each other in the radial direction. Since the tire of the illustrated embodiment runs on a runway at a maximum speed of about 360 km/hr in the taxing or landing, the vicinity of the tread ends or the vicinity of the side ends 44, 45 of the inner belt plies 41 are grown outward in the radial direction through centrifugal force. As a result the ground contact pressure in the vicinity of the tread ends rises to locally generate heat at these ends, and consequently there is caused a fear of decreasing the strength of cord and causing thermal degradation and thermal breakage of rubber. However, when the extra laminated portions having a higher circumferential rigidity formed by piling three strips 43 at the side ends 44, 45 of the inner belt plies 41 are overlapped with each other in the radial direction as mentioned above, the circumferential rigidity at these tread ends (portion having a largest size growth) is locally increased to effectively control the size growth in the vicinity of the tread ends. Thus, the local heat generation in the vicinity of the tread ends is suppressed and also the decrease of cord strength and thermal degradation and thermal breakage of rubber are prevented. When the width of the inner belt plies 41 (two plies) as a standard is constant and the width of the inner belt plies (two plies) adjacent to the standard inner belt plies are variously changed, the amount of size growth produced in the vicinity of the side ends 44, 45 of the standard inner belt plies 41 through centrifugal force is measured by using the finite element method to obtain results as shown in FIG. 13. In FIG. 13 an ordinate is a radial growth ratio obtained by dividing an amount of size growth produced in the vicinity of the side ends 44, 45 of the inner belt plies 41 by an amount of size growth produced on the equatorial plane E of the tire, and an abscissa is a distance L between the side end of the standard inner belt plies 41 and the side end of the inner belt plies 41 adjacent thereto. In this case, the width W of the strip 43 is 5 mm. As seen from the graph of FIG. 13, when the distance L is not more than 0.9 times of the width W (mm) or is not more than 4.5 mm, the size growth in the vicinity of the side ends 44, 45 of the plies are effectively suppressed, while when the distance L exceeds 4.5 mm, the size growth rapidly increases, so that the distance L is limited to not more than 0.9 times the width W.

In order to suppress size growth in the vicinity of the side ends 44, 45 of the inner belt plies 41 as mentioned above, the strip 43 may be extended in form of a straight line along the side ends 44, 45 of the ply or along the equatorial plane E only by a given length as shown in FIG. 7. As a result the straight extended portions of the strip 43 may be overlapped one after another in the radial direction when the strip 43 is wound many times while being shifted in the circumferential direction. In this case, the overlapping number of the strip 43 is determined by the length of the straight extended portion, and increases as the length becomes long. Thus, the circumferential rigidity at the side ends 44, 45 of the inner belt plies 41 is locally increased to effectively suppress the generation in the vicinity of the tread ends likewise, the above case.

The invention will be described with respect to the following test example. In this test, there are provided a comparative tire 1 comprising a belt comprised of 12 belt plies each containing many cords inclined in the same direction, a comparative tire 2 comprising a belt comprised of only 8 belt plies each containing zigzag cords embedded therein, a test tire 1 corresponding to the embodiment of FIGS. 1 and 2, a test tire 2 having the same structure as in the test tire 1 except that each of the outer belt plies is comprised of the same cords extending zigzag in the circumferential direction as in the inner belt plies, and a test tire 3 having the same structure as in the test tire 1 except that the extra laminated portions are piled one upon the other in the radial direction. The dimensions of the belt plies constituting the belt of the comparative tire 1 are shown in Table 1.

TABLE 1

| Ply No. | first ply | second ply | third ply | fourth ply |
|---|---|---|---|---|
| Cord angle (degree) | 30 | 30 | 25 | 25 |
| End count (cords/5 cm) | 26 | 26 | 37 | 37 |
| Ply No. | fifth ply | sixth ply | seventh ply | eighth ply |
| Cord angle (degree) | 0 | 20 | 16 | 16 |
| End count (cords/5 cm) | 36 | 37 | 37 | 37 |
| Ply No. | ninth ply | tenth ply | eleventh ply | twelfth ply |
| Cord angle (degree) | 16 | 16 | 16 | 16 |
| End count (cords/5 cm) | 37 | 37 | 37 | 37 |

In Table 1, the first ply is a ply located nearest to the carcass, while the twelfth ply is a ply located nearest to the tread rubber, and the fifth ply contains cords arranged in parallel to the equatorial plane E of the tire. The cords embedded in all of the plies are nylon-6,6 fiber cords of 1890 d/3, and the cut ends thereof are exposed at the side ends of each of these plies. On the other hand, the belt of the comparative tire 2 comprises 8 belt plies having the same structure as the inner belt plies of the embodiment shown in FIG. 2. Each of the plies is formed by providing a rubberized strip of 0.12 mm in gauge and 5.5 mm in width containing 4 nylon-6,6 fiber cords of 1890 d/4 with a cord diameter of 1.1 mm and winding it in the same manner as in the embodiment of FIGS. 3 to 5 (radius of curvature R is 105–520 mm) provided that the cord angle A with respect to the equatorial plane is 11.0°–13.9° (the cord angle becomes small as the belt ply locates outward in the radial direction). Moreover, in these belt plies, the value of distance L/width W is 1.20, so that the extra laminated portions are not piled one upon the other. On the contrary, the inner belt plies of the test tire 1 are the same as in the comparative tire 2 except that the cord angle with respect to the equatorial plane is 11.0°–12.2°, and each of the two outer belt plies contains nylon-6,6 fiber cords of 1890 d/3 inclined at a cord angle B of 26° with respect to the equatorial plane at an end count of 37 cords/5 cm, the cords of which plies are crossed with each other with respect to the equatorial plane. Furthermore, the test tire 2 has the same inner belt plies as in the test tire 1, but the outer belt plies are formed by winding the same strip as in the comparative tire 2 (radius of curvature R is 23–123 mm, L/W is 1.20) as to have a cord angle B of 19.5°–21.5° with respect to the equatorial plane (two zigzags per one circumference). Also, the test tire 3 has the same inner and outer belt plies as in the test tire 1 except that the value of L/W is 0.23 and the extra laminated portions are piled one upon the other in the radial direction. Moreover, the tire size of each of these tires is H46×18.0R20 28PR.

The weight of each of these tires is calculated by an index on the basis that the weight of bias tire having the same tire size (H46×18.0–20 28PR) is 100. As a result, the weight as an index value is reduced to 89 in the comparative tire 1 and 79 in the comparative tire 2 and the test tires 1 and 2, respectively, and 78 in the test tire 3. Then, each of these tires is inflated under an internal pressure of 15.5 kgf/cm² and run on a drum at a speed of 64 km/hr under a load of 20000 kg and a slipping angle of 4.0° over a distance of 10.7 km, and such a running operation is repeated 70 times at maximum. As a result, separation failure at the belt end occurs after the 20 times repetition of this operation in the comparative tire 1, but there is caused no trouble in the comparative tire 2 and the test tires 1, 2 and 3 even after the 70 times repetition of the above operation. After damage having the same depth as in FIG. 8 is formed in the belt of each of these tires by means of a knife, the taxing test at a maximum speed of 360 km/hr is repeated on a drum under an internal pressure of 15.5 kgf/cm$^2$, a load of 20000 kg and a slipping angle of 0° according to a chart defined in FIG. 1 of TSO. C62c 50 times at maximum. As a result, the cut peel off occurs after the first taxing test in the comparative tire 2, but there is caused no cut peel off in the comparative tire 1 and the test tires 1, 2 and 3 even after the 50 times repetition of the test. Further, the surface temperature at the ground contact region of the tire in the above taxing test is measured by means of an infrared ray detecting-type non-contact thermometer to determine a temperature rise from the start of running to the stop of running. As a result, the temperature rise is 57° C. in the comparative tire 1, 42° C. in the comparative tire 2, 48° C. in the test tire 1 and 50° C. in the test tire 2, while the test tire 3 shows a temperature rise of 37° C. and can effectively control the heat generation as compared with the comparative tires 1 and 2.

Although the belt is only comprised of the inner belt plies 41 and the outer belt plies 42 in the above embodiments, a belt ply different from the plies 41, 42 may be interposed between the inner belt ply 41 and the outer belt ply 42.

As mentioned above, according to the invention, the occurrence of cut peel off in the tire can be prevented with the prevention of standing wave while reducing the tire weight.

What is claimed is:

1. A pneumatic radial airplane tire comprising; a toroidal carcass comprised of at least two carcass plies each containing plural cords arranged substantially in a direction perpendicular to an equatorial plane of the tire, a tread rubber arranged outward on the carcass in a radial direction of the tire, and a belt disposed between the carcass and the tread rubber, said belt being comprised of a plurality of radially inner belt plies located at a side near to the carcass and a plurality of radially outer belt plies located at a side near to the tread rubber, each of said radially inner belt plies being formed as a pair of plies by winding a rubberized strip (43) having parallel arranged plural cords many times while being shifted by a width (W) of the strip in the circumferential direction and reciprocatedly moved between the side ends of the ply to have a cord angle A of 5°–15° with respect to the equatorial plane of the tire and axially bent with a given radius of curvature (R) at both side ends to continuously form at each side end of the ply a narrow-width extra laminated portion (48) of bent triangular zones (47) in the circumferential direction, a width of a pair of radially inner belt plies located outward in the radial direction being narrower than a width of a neighboring pair of radially inner belt plies located inward in the radial direction, and each of said radially outer belt plies being formed as a pair of plies in the same manner as are formed said radially inner belt plies but wherein a cord angle B in the radially outer belt plies with respect to the equatorial plane is larger than said cord angle A by not less than 5°.

2. A pneumatic radial tire according to claim 1, wherein the ratio of the radius of curvature R in the strip at each side end of each belt ply to the width W of the strip is not less than 2.0.

3. A pneumatic radial tire according to claim 1 wherein an axial distance L between the side ends on each side of neighboring pairs of the radially inner belt plies and of said radially outer belt plies is not more than 0.9 times of the width W of the strip.

\* \* \* \* \*